(12) United States Patent
Park et al.

(10) Patent No.: US 11,120,536 B2
(45) Date of Patent: Sep. 14, 2021

(54) APPARATUS AND METHOD FOR DETERMINING IMAGE SHARPNESS

(71) Applicant: Samsung Electronics Co., Ltd., Gyeonggi-do (KR)

(72) Inventors: Seongjun Park, San Jose, CA (US); Shuangquan Wang, San Diego, CA (US); Jungwon Lee, San Diego, CA (US)

(73) Assignee: Samsung Electronics Co., Ltd

( * ) Notice: Subject to any disclaimer, the term of this patent is extended or adjusted under 35 U.S.C. 154(b) by 102 days.

(21) Appl. No.: 16/514,560

(22) Filed: Jul. 17, 2019

(65) Prior Publication Data

US 2020/0193584 A1 Jun. 18, 2020

Related U.S. Application Data

(60) Provisional application No. 62/778,542, filed on Dec. 12, 2018.

(51) Int. Cl.
*G06T 7/00* (2017.01)
*G06T 5/00* (2006.01)
(Continued)

(52) U.S. Cl.
CPC ............ *G06T 7/0002* (2013.01); *G06T 5/003* (2013.01); *G06T 5/20* (2013.01); *G06T 5/50* (2013.01); *G06T 2207/20021* (2013.01)

(58) Field of Classification Search
CPC ........... G06T 5/00; G06T 7/002; G06T 5/003; G06T 5/50; G06T 5/20;
(Continued)

(56) References Cited

U.S. PATENT DOCUMENTS 7,072,523 B2 7/2006 Bolle et al.
7,512,286 B2 3/2009 Luo
(Continued)

OTHER PUBLICATIONS

Zhou Wang et al., "Image Quality Assessment: From Error Visibility to Structural Similiarity", IEEE Transactions on Image Processing, vol. 13, No. 4, Apr. 2004, 14 pages.
(Continued)

*Primary Examiner* — Nancy Bitar
(74) *Attorney, Agent, or Firm* — The Farrell Law Firm, P.C.

(57) ABSTRACT

An apparatus and method for determining image sharpness is provided. According to one embodiment, an apparatus includes a weight device configured to determine a weight map of a reference image; an image sharpening device configured to sharpen the reference image using at least one sharpening method; an edge activity map device connected to the image sharpening device and configured to determine a first edge activity map $\Phi(x, y)$ for each sharpened image of reference image by the at least one sharpening method; and an edge sharpness metric device connected to the weight device and the first edge activity map device and configured to determine an edge sharpness metric (ESM) for each sharpened image of the reference image by the at least one sharpening method based on the weight map and the edge activity map for each sharpened image of the reference image by the at least one sharpening method.

18 Claims, 7 Drawing Sheets

(51) Int. Cl.
*G06T 5/50* (2006.01)
*G06T 5/20* (2006.01)

(58) Field of Classification Search
CPC . G06T 2207/20021; G06T 2207/30168; G06T 7/40; G06T 2207/1004; G06T 2207/20056; G06T 2207/20192; G06K 9/46

See application file for complete search history.

(56) References Cited

U.S. PATENT DOCUMENTS

| | | | |
|---|---|---|---|
| 7,545,985 B2 | 6/2009 | Zhang et al. | |
| 8,306,262 B2 | 11/2012 | Li | |
| 8,606,034 B2 | 12/2013 | Ha et al. | |
| 8,660,364 B2 | 2/2014 | Rezazadeh et al. | |
| 8,754,988 B2 | 6/2014 | Baker | |
| 9,087,262 B2 | 7/2015 | Chen et al. | |
| 9,542,736 B2 | 1/2017 | Bhardwaj et al. | |
| 9,672,636 B2 | 6/2017 | Zhang et al. | |
| 9,686,526 B2 | 6/2017 | Pettersson et al. | |
| 2009/0169102 A1* | 7/2009 | Zhang | H04N 5/3653 382/167 |
| 2013/0142421 A1* | 6/2013 | Silver | G06K 9/6204 382/159 |
| 2014/0355881 A1* | 12/2014 | Bhardwaj | G06T 7/0002 382/173 |

OTHER PUBLICATIONS

Peter D. Burns, "Refined Measurement of Digital Image Texture Loss", Proc. SPIE vol. 8653, Image Quality and System Performance X, 2013, 6 pages.

F. Cao et al., "Measuring Texture Sharpness of a Digital Camera", Society of Photo-Optical Instrumentation Engineers, 2009, 9 pages.

Peter D. Burns et al., "Measurement of Texture Loss for JPEG 2000 Compression", Proc. SPIE vol. 8293, Image Quality and System Performance IV, 2012, 8 pages.

Kartic Subr et al., "Edge-preserving Multiscale Image Decomposition based on Local Extrema", ACM SIGGRAPH Conference Proceedings, 2009, 9 pages.

Phong Van Vu, "On the Use of Image Sharpness Measure to JPEG2000 No-Reference Image Quality Assessment", Posts and Telecommunications Insititute of Technology, Hanoi, Vietnam, 2004Dec. 2013, pp. 1-77.

Y. Yao, B. Abidi, N. Doggaz, and M. Abidi, "Evaluation of Sharpness Measures and Search Algorithms for the Auto-Focusing of High-Magnification Images," SPIE Proceedings Visual Information Processing XV, vol. 6246, 2006, pp. 1-12.

* cited by examiner

APPARATUS AND METHOD FOR DETERMINING IMAGE SHARPNESS

PRIORITY

This application claims priority under 35 U.S.C. § 119(e) to a U.S. Provisional Patent Application filed on Dec. 12, 2018 in the United States Patent and Trademark Office and assigned Ser. No. 62/778,542, the entire contents of which are incorporated herein by reference.

FIELD

The present disclosure relates generally to image analysis, and more particularly, to an apparatus and method for determining image sharpness.

BACKGROUND

Human vision is a good image capture system, and no device has been developed that is superior to the human eye. There are a number of factors for judging image quality including noise level, dynamic range, and color. Among the factors, sharpness is a critical characteristic, because the human eye is sensitive to variations in luminance and the most important information comes from outlines and edges of objects in an image. However, it is not easy to determine a level of sharpness in a quantitative and objective manner. Conventional image metrics such as peak signal-to-noise ratio (PSNR) and structural similarity index (SSIM) do not indicate a level of sharpness, although PSNR and SSIM are effective for other factors such as color fidelity or noise reduction.

It is not easy to evaluate how good an image looks because a judgment of whether an image is aesthetically good looking mainly depends on the preference of the viewer. When a human looks at an image to determine whether the quality of the image is good or not, a variety of image features are considered such as dynamic range, distortion, color aberration, shading, color gamut, color accuracy, noise level, and sharpness at the same time just through intuition without recognizing the image features. Typically, the best way to identify good looking images is to have many people view images to choose which one is better and collect mean opinion scores. However, this subjective assessment normally requires a lot of time and expense, not to mention inconvenience.

SUMMARY

According to one embodiment, an apparatus is provided. The apparatus includes a weight device configured to determine a weight map $W(x, y)$ of a reference image $I_R(x, y)$, where x is pixel of the reference image in a horizontal direction, and y is a pixel of the reference image in a vertical direction; an image sharpening device configured to sharpen the reference image using at least one sharpening method; an edge activity map device connected to the image sharpening device and configured to determine an edge activity map $\Phi(x, y)$ for each sharpened image of the reference image by the at least one sharpening method; and an edge sharpness metric device connected to the weight device and the edge activity map device and configured to determine an edge sharpness metric (ESM) for each sharpened image based on the weight map and the edge activity map for each sharpened image.

According to one embodiment, a method is provided. The method includes determining, by a weight device, a weight map $W(x, y)$ of a reference image $I_R(x, y)$, where x is pixel of the reference image in a horizontal direction, and y is a pixel of the reference image in a vertical direction; sharpening, by an image sharpening device, the reference image using at least one sharpening method; determining, by an edge activity map device connected to the image sharpening device, an edge activity map $\Phi(x, y)$ for each sharpened image of the reference image by the at least one sharpening method; and determining, by an edge sharpness metric device connected to the weight device and the edge activity map device, an edge sharpness metric (ESM) for each sharpened image of the reference image by the at least one sharpening method based on the weight map and the edge activity map for each sharpened image of the reference image by the at least one sharpening method.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
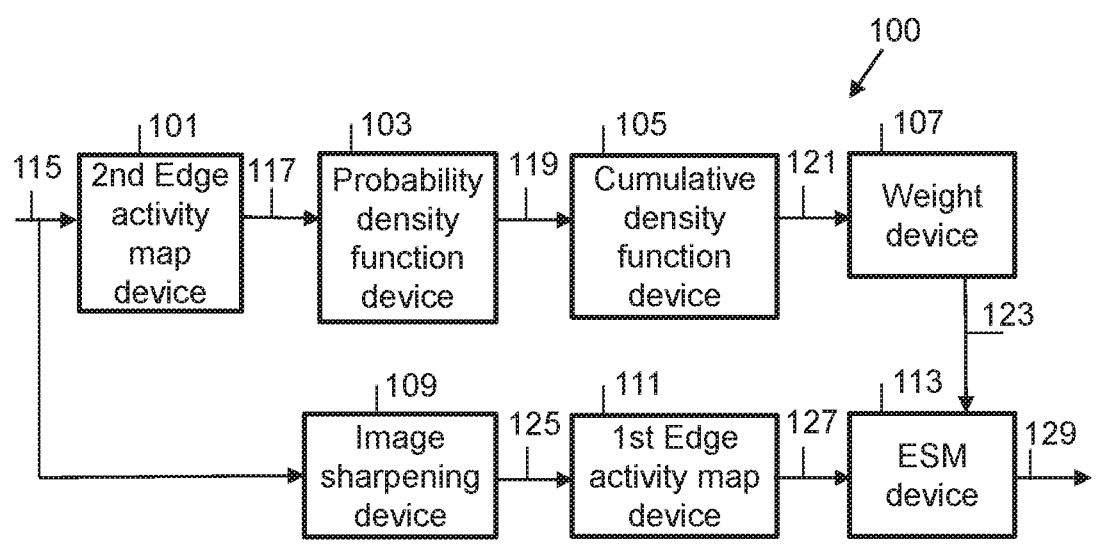
FIG. 1 is a block diagram of an apparatus for determining image sharpness, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

There is a need for an objective image quality measurement apparatus and method derived from sophisticated modeling of a human vision system (HVS) so as to evaluate images automatically, even though such an apparatus and method cannot reflect a subjective HVS preference perfectly. The present disclosure discloses an apparatus and a method of determining a level of sharpness of an image based on an edge activity map. The benefit of determining a level of sharpness of an image is to enable consideration of both noise and sharpness to measure image quality.

Sharpening an image is one of the most effective ways to improve the quality of the image by boosting edges and texture areas degraded by the limits of camera sensors used to obtain the image, where a sharpened image presents a more realistic image to a viewer. However, a trade-off is that a sharpened image may be noisier than the unsharpened image. While it is easy for a human to discriminate a noise component from a texture component, it is difficult for a machine because both noise components and texture components have detailed pixel fluctuations and vibrations. Thus, measuring sharpness of an image in an objective way is challenging. While PSNR, SSIM, and several sharpening metrics exist to calculate image characteristics, they mostly do not produce results that correspond with actual human perception of an image.

The objective image metrics may be classified into full reference metrics, test chart metrics, and no-reference metrics.

If images satisfying human's eyes completely are provided, a person may be able to determine image quality by a side-by-side comparison. While it is impossible to obtain perfect images, ground truth (GT) images with sufficiently high quality may be obtained in some situations. PSNR and SSIM are the most commonly used full reference metrics when a GT image is provided. In addition, rather than using PSNR to calculate a physical intensity difference, SSIM, which is known to produce results that correspond better with human perception, measures three fundamental aspects: luminance (mean, $\mu_x$), contrast (standard deviation, $\sigma_x$), and structure (normalized distribution, $(x-\mu_x)/(\sigma_x)$). A combination of these three aspects are expressed in Equation (1) below:

$$SSIM(X, Y) = \frac{2(\mu_x\mu_y + C_1)(2\sigma_{xy} + C_2)}{(\mu_x^2 + \mu_y^2 + C_1)(\sigma_x^2 + \sigma_y^2 + C_2)} \quad (1)$$

where X and Y indicate a GT image and a test image, respectively, and $C_1$, $C_2$, and $C_3$ are constants that prevent instability when the denominator is very close to zero. The SSIM index corresponds more with human perception than a pixel-difference approach such as PSNR or mean square error (MSE). A drawback of full reference metrics is that a good GT image is not obtainable in most cases. To use full reference metrics, a GT image must be perfectly aligned with a test image, because processing of the GT image and the test image is done on a per pixel basis. In addition, SSIM is not effective for measuring sharpness quality because sharpness mainly depends on edges and boundaries, which are a small portion of a whole image. Most image areas are composed of smooth regions. Thus, an SSIM index is predominantly determined by the noise level in a smooth region.

Another method of measuring sharpness quality is to use test charts. Texture modulation transfer function (texture-MTF) takes care of both edge and fine-detail areas with a test image, e.g., a dead-leaves (a.k.a. spilled-coins) test chart that is a combination of natural detail scenes. Texture-MTF is defined as a power spectrum between a GT image and a target image as expressed in Equation (2) below:

$$MTF_{2D}(m, n) = \sqrt{\frac{I(m, n)}{G(m, n)}} \quad (2)$$

where I(m, n) and G(m, n) are discrete Fourier transforms (DFTs) of i(x, y) and g(x,y), i(x, y) is a target image, and g(x, y) is a GT image. The resulting two dimensional (2D) texture-MTF is converted to one dimension (1D), $MTF_{tex}$ (v), by a radial-average where $v=\sqrt{m^2+n^2}$. Along with 1D graphical line texture-MTF, a summary measure, acutance ($\tau$ expressed in Equation (3) below), is computed by weighting the texture-MTF by a contrast sensitivity function (CSF).

$$\tau = \frac{\int MTF_{tex}(v)CSF(v)dv}{\int CSF(v)dv} \quad (3)$$

Since texture-MTF and acutance are dedicated sharpness metrics, they perform better than SSIM. In addition, they do not require perfect alignment for per-pixel processing as does SSIM. However, test chart metrics have a drawback that they cannot measure image quality (IQ) for typical images taken by average users. No-reference metrics have an advantage of being able to provide an IQ number for an image without requiring a reference image. Among various no-reference metrics, sharpness measurement is classified into 5 categories: a gradient-based category, an edge-based category, a correlation-based category, a statistics-based category, and a transform-based category. Among these 5 categories, edge-based measurement is the most commonly used approach. Most autofocus systems in cameras, except for phase detection autofocus (PDAF), are based on a Sobel edge and gradient, expressed in Equation (4) below, where M is width and N is height:

$$G_v(x, y) = \begin{bmatrix} 1 & 0 & -1 \\ 2 & 0 & -2 \\ 1 & 0 & -1 \end{bmatrix} * I(x, y), \quad (4)$$

$$G_h(x, y) = \begin{bmatrix} 1 & 2 & 1 \\ 0 & 0 & 0 \\ -1 & -2 & -1 \end{bmatrix} * I(x, y),$$

$$S = \sum_M \sum_N \Phi'(x, y), \text{ while}$$

$$\Phi'(x, y) = \begin{cases} \sqrt{G_v^2 + G_h^2}, & \text{if } \sqrt{G_v^2 + G_h^2} > T \\ 0, & \text{else} \end{cases}$$

As disclosed above, full reference and test base metrics are not useful for typical images, and no-reference metrics may be used for average snapshot images. However, there is a disadvantage that no-reference metrics view image quality only in terms of sharpness, which may not always produce a result that corresponds with human perception because image sharpness and noise are trade-offs; The sharper, the noisier.

In an embodiment, an apparatus and method determines a metric (e.g., an ESM) for measuring sharpness corresponding to actual visual impact by considering both plain (e.g., smooth) and detailed areas of an image.

The ESM is composed of two parts, a smooth region score ($S_s$) and a detailed region score ($S_d$) as expressed in Equation (5) below:

$$S = S_d - S_s \quad (5)$$

A good image sharpening method should increase image sharpness in detailed areas and should not increase image sharpness in plain or smooth areas. Unfortunately, image sharpness metrics as described in Equation (4) above do not distinguish between smooth areas and detailed areas. For example, an input image and the input image with additive white Gaussian noise (AWGN) all over an area in the input image may be provided. The input image may be sharpened using a sharpening method. The sharpness metric of Equation (4) above may be generated for each of the input image, the input image with AWGN, and the sharpened input image. According to the sharpness metric values generated by Equation (4) above, the input image with AWGN may be determined to exhibit the best quality (e.g., the highest sharpness metric value). This result may not correspond to human perception, where the sharpened image of the input image may be perceived to exhibit the best quality.

Since increasing sharpness in a smooth area is not desirable, Equation (5) above imposes a penalty at $S_s$ as expressed in Equation (6) below:

$$S = \frac{\sum_{y=0}^{M-1} \sum_{x=0}^{N-1} W(x, y) \Phi(x, y)}{MN} \quad (6)$$

where $W(x, y)$ is a weight map having values between [−1 1] for the image width M and height N. The smooth regions may have negative $W(x, y)$ and the detail regions may have positive $W(x, y)$. $\Phi(x, y)$ is a Sobel map obtained from a magnitude of vertical and horizontal Sobel values as in Equation (7) below:

$$\Phi(x,y) = \sqrt{G_v(x,y)^2 + G_h(x,y)^2} \quad (7)$$

where $G_v$ and $G_h$ are defined as in Equation (4) above.

A weight map is generated as described below. ESM requires a reference image (e.g., an input image) obtained from, for example, a photo. The purpose of the ESM is to compare image quality across a variety of sharpening methods with the same input. The initial step is to build an edge activity map (e.g., a Sobel map) from the reference image, using a Sobel operator per pixel as expressed in Equation (8) below:

$$\Phi_R(x, y) = \sqrt{G_{vR}(x, y)^2 + G_{hR}(x, y)^2}, \quad (8)$$

$$G_{vR}(x, y) = \begin{bmatrix} 1 & 0 & -1 \\ 2 & 0 & -2 \\ 1 & 0 & -1 \end{bmatrix} * I_R(x, y),$$

$$G_{hR}(x, y) = \begin{bmatrix} 1 & 2 & 1 \\ 0 & 0 & 0 \\ -1 & -2 & -1 \end{bmatrix} * I_R(x, y)$$

Next, a probability density function (PDF) of the edge activity map is determined. Then, a cumulative density function (CDF) is determined from the PDF. Images are divided into smooth areas and detailed areas. In one embodiment, a CDF value of a processed pixel that is less than a threshold indicates a smooth area, and a CDF value of a processed pixel that is greater than the threshold indicates a detailed area. If the threshold is set to 0.5, an image may be divided evenly between smooth areas and detailed areas.

An edge activity map and a weight map of a reference image are obtained. The edge activity map is calculated from the reference image which has not been sharpened. When the threshold is 0.5 which is a median point of Sobel CDF, the regions are divided equally between smooth regions and detailed regions. Thus, if a Sobel value is less than the median, it is a smooth region and if a Sobel value is greater than the median value, it is a detailed region. In the weight map, a detailed region assigns a positive weight value and a smooth region assigns a negative weight value.

A weight value between [−1 1] is assigned as described below. A sigmoid function as expressed in Equation (9) below may be used, where the sigmoid function slowly increases from a lower asymptote at 0 to an upper asymptote at 1.

$$\text{sgn}(t) = \frac{1}{1 + e^{-t}} \quad (9)$$

A weight function $\rho(\cdot)$ produces a value between [−1 1] as expressed in Equation (10) below:

$$\rho(t) = 2(\text{sgn}(\alpha(t-\beta)) - 0.5) = 2\left(\frac{1}{1+\exp(-\alpha(t-\beta))} - 0.5\right) \quad (10)$$

where α and β are parameters for adjusting the shape of the weight function. α is a slope parameter. As α decreases, the slope gets steeper. For example, α=10 may be an appropriate value that provides a good slope, β is a centering parameter. As β decreases, weighting in the detailed areas increases. If an image is to be divided evenly between smooth areas and detailed areas, set β=0.5.

The CDF may be denoted by a function F(·) and a CDF of a Sobel map of a reference image $\Phi_R$ (x, y) is $F(\Phi_R(x, y))$. The weight map W(x, y) for each pixel (x, y) is expressed by combining $F(\Phi_R(x, y))$ and Equation (10) as expressed in Equation (11) below:

$$W(x, y) = 2\left(\frac{1}{1+\exp(-10(F(\Phi_R(x, y))-0.5))} - 0.5\right) \quad (11)$$

where α=10 and β=0.5.

ESM is used to compare the performance of sharpening methods. To find a method that best sharpens an input image (e.g., a reference image), a weight map is first determined from the reference image. Then, an edge activity map of each sharpened image is determined, where, for example, $\Phi_1(x, y)$ is an edge activity map of a first image $Q_1$, where the first image $Q_1$ is a sharpened image of the reference image using a first sharpening method, and $\Phi_2$ (x, y) is an edge activity map of a second image $Q_2$, where the second image $Q_2$ is a sharpened image of the reference image using a second sharpening method that is different from the first sharpening method used to generate $Q_1$. Then, the ESM numbers $S_1$ and $S_2$ for $Q_1$ and $Q_2$, respectively, may be determined using Equation (6) above, as expressed in Equations (12) and (13) below:

$$S_1 = \frac{\sum_{y=0}^{M-1}\sum_{x=0}^{N-1} W(x, y)\Phi_1(x, y)}{MN} \quad (12)$$

$$S_2 = \frac{\sum_{y=0}^{M-1}\sum_{x=0}^{N-1} W(x, y)\Phi_2(x, y)}{MN} \quad (13)$$

A higher ESM number indicates better sharpening performance, where both smooth areas and detailed areas are considered. The same W(x, y) used for the reference image is used for $S_1$ and $S_2$, but instead of using $\Phi_R(x, y)$ for the reference image, $\Phi_1$ is used for the first image $Q_1$ and $\Phi_2$ is used for the second image $Q_2$.

If there is no reference image and only a first image Q1 and a second image Q2 then ESM for the Q1 and Q2 are calculated as in Equation (14) and Equation (15) as follows:

$$S_1 = \frac{\sum_{y=0}^{M-1}\sum_{x=0}^{N-1} W_1(x, y)\Phi_1(x, y)}{MN} \quad (14)$$

$$S_2 = \frac{\sum_{y=0}^{M-1}\sum_{x=0}^{N-1} W_1(x, y)\Phi_2(x, y)}{MN} \quad (15)$$

where $W_1$ is as in Equation (16) as follows:

$$W_1(x, y) = 2\left(\frac{1}{1+\exp(-10(F(\Phi_1(x, y))-0.5))} - 0.5\right) \quad (16)$$

$\Phi_1$ in Equation (14) and (16) are the same. Thus, an ESM score may be obtained without a reference image.

The reference image may be an entire image or a sub-image. When measuring an ESM for an entire image, the reference image is an entire image. When measuring an ESM for a sub-image, the reference image is a sub-image.

The present disclosure provides an apparatus and a method for determining a sharpening metric (e.g., ESM). The ESM does not require a GT image, which is difficult to obtain in most cases, as does SSIM or PSNR, and does not require a test chart as does texture MTF or acutance. Thus, the present disclosure enables measurement of sharpness quality for any kind of image and provides a more precise metric that corresponds to human perception than does conventional metrics for sharpness.

FIG. 1 is a block diagram of an apparatus 100 for determining image sharpness, according to an embodiment.

Referring to FIG. 1, the apparatus 100 includes a first edge activity map device 111, a probability density function device 103, a cumulative density function device 105, a weight device 107, an image sharpening device 109, a second edge activity map device 101, and an ESM device 113.

The image sharpening device 109 includes an input connected to an input 115 of the second edge activity map device 101 for receiving an image (e.g., the reference image $I_R$(x, y)) to sharpen, and an output 125 for outputting a sharpened version of the reference image. The image sharpening device 109 includes a method of sharpening an image. In an embodiment, the image sharpening device 109 includes more than one sharpening method, where the sharpening methods are different from each other. The sharpening methods may be used to sharpen the reference image $I_R$ (x, y) using each of the more than one sharpening method in order to determine which sharpening method produces the sharpest image. For example, the image sharpening device 109 may include two different sharpening methods to sharpen two images to produce $Q_1$ and $Q_2$, respectively, where $Q_1$ and $Q_2$ are two sharpened images of the reference image $I_R$(x, y). The sharpening method may include a Laplacian sharpening method and an edge preserving sharpening method. However, the apparatus 100 of the present disclosure is not limited to using these two sharpening methods but may use any sharpening method.

The first edge activity map device 111 includes an input connected to the output 125 of the image sharpening device 109 for receiving the sharpened image (or more than one sharpened image if more than one sharpening method is used by the image sharpening device 109), and an output 127 for outputting an edge activity map Φ(x, y) of the sharpened image (or an edge activity map of each sharpened image if more than one image is sharpened (e.g., $\Phi_1$(x, y) and $\Phi_2$ (x, y) if two edge activity maps are determined for two sharpened images $Q_1$ and $Q_2$, respectively)). In an embodiment, the first edge activity map device 111 may output a Sobel map for each image sharpened as defined above in Equation (7).

The ESM device 113 includes a first input connected to the output 123 of the weight device 107 for receiving the weight map W(x, y), a second input connected to the output 127 of the second edge activity map device 101 for receiving the edge activity map Φ(x, y) or each edge activity map for each image sharpened if more than one image is sharpened, and an output for outputting an edge sharpness metric S as in Equation (6) above (or more than one edge sharpness metric if more than one image is sharpened (e.g., $S_1$ and $S_2$ for $Q_1$ and $Q_2$) that indicates the sharpness of a sharpened image (or the sharpness of more than one image if more than one image is sharpened).

The second edge activity map device 101 includes the input 115 for receiving an input image (e.g., a reference image $I_R$(x, y), where x is pixel of the reference image in a horizontal direction, and y is a pixel of the reference image in a vertical direction), and an output 117 for outputting an edge activity map of the reference image $Φ_R$(x, y). In an embodiment, the second edge activity map device 101 may output a Sobel map as defined above in Equation (8).

The probability density function device 103 includes an input connected to the output 117 of the second edge activity map device 101 for receiving the edge activity map, and an output 119 for outputting a PDF of the edge activity map $Φ_R$(x, y).

The cumulative density function device 105 includes an input connected to the output 119 of the probability density function device 103 for receiving the PDF of the edge activity map, and an output 121 for outputting a CDF of the PDF.

The weight device 107 includes an input connected to the output 121 of the cumulative density function device 105 for receiving the CDF, and an output 123 for outputting a weight map W(x, y) with values between [−1 1] according to the weight function ρ(t) in Equation (10) above.

Figure 2:
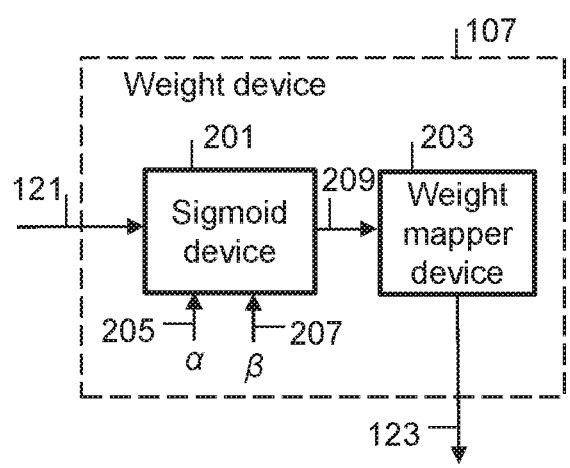
FIG. 2 is a block diagram of a weight generator of FIG. 1, according to an embodiment.

FIG. 2 is a block diagram of the weight device 107 of FIG. 1, according to an embodiment.

Referring to FIG. 2, the weight 107 includes a sigmoid device 201 and a weight mapper device 203.

The sigmoid device 201 includes a first input 121 for receiving a CDF, a second input 205 for receiving a parameter α, a third input 207 for receiving a parameter β, and an output 123 for outputting sgn(α(t−β)). The parameter α adjusts the slope of the weight function ρ(t) in Equation (10) above. The parameter β is a centering parameter for dividing an image between smooth areas and detailed areas, where as β decreases, weighting in the detailed areas increases. For example, α=10 may be an appropriate value that provides a good slope, and setting β to 0.5 will divide an image evenly between smooth areas and detailed areas, as in Equation (11) above.

The weight mapper device 203 includes an input connected to the output 209 of the sigmoid device 201 for receiving sgn(α(t−β)), and an output 123 for outputting the weight map W(x, y) as in, for example, Equation (11) above.

Figure 3:
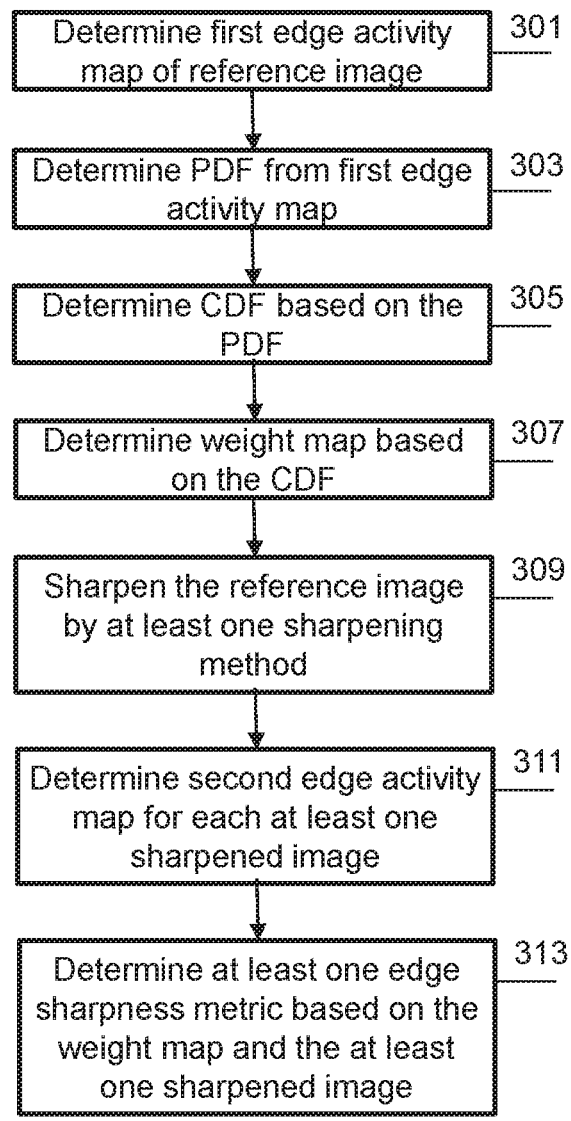
FIG. 3 is a flowchart of a method of determining image sharpness, according to one embodiment.

FIG. 3 is a flowchart of a method of determining image sharpening, according to one embodiment.

Referring to FIG. 3, a first edge activity map $Φ_R$(x, y) is determined for an input image (e.g., a reference image $I_R$(x, y), where x is pixel of the reference image in a horizontal direction, and y is a pixel of the reference image in a vertical direction) by a first edge activity map device at 301. In an embodiment, the first edge activity map may be a Sobel map as defined above in Equation (8).

At 303, a PDF of the first edge activity map $Φ_R$(x, y) is determined by a probability density function device.

At 305, a CDF is determined for the PDF by a cumulative density function device.

At 307, a weight map W(x, y) with values between [−1 1] according to the weight function ρ(t) in Equation (10) above is determined from the CDF by a weight device.

At 309, the reference image is sharpened by at least one sharpening method of an image sharpening device. The sharpening method may include a Laplacian sharpening method and an edge preserving sharpening method. However, the method of the present disclosure is not limited to using these two sharpening methods but may use any sharpening method.

At 311, at least one second edge activity map is determined from the at least one sharpened image by a second edge activity map device. In an embodiment, the at least one second edge activity map may be a Sobel map for each image sharpened as defined above in Equation (8).

At 313, at least one edge sharpness metric S as in Equation (6) above is determined by an ESM device from the weight map W(x, y) and the at least one second edge activity map.

Figure 4:
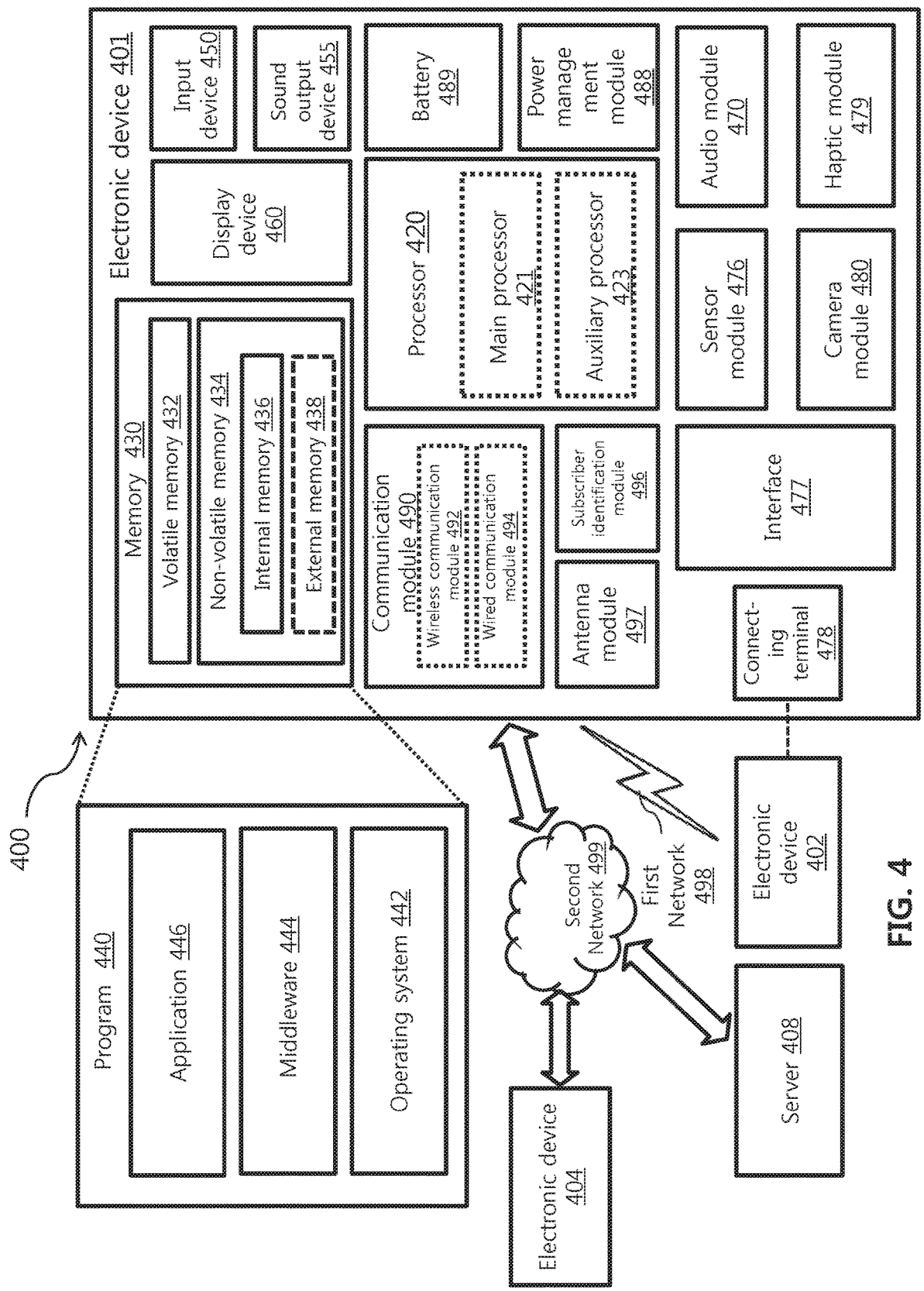
FIG. 4 is a block diagram of an electronic device in a network environment to which an apparatus and a method of the present disclosure is applied, according to one embodiment.

FIG. 4 is a block diagram illustrating an electronic device 401 in a network environment 400 according to various embodiments.

Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. Some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. As at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). The auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. The display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. The audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wiredly) or wirelessly. The interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). The connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. The haptic module 479 may include, for example, a motor, a piezoelectric element, or an electric stimulator.

The camera module 480 may capture a still image or moving images. The camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. The battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. The communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. The antenna module 497 may include an antenna including a radiating element composed of a conductive material or a conductive pattern formed in or on a substrate (e.g., PCB). The antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. Another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According various embodiments, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 5:
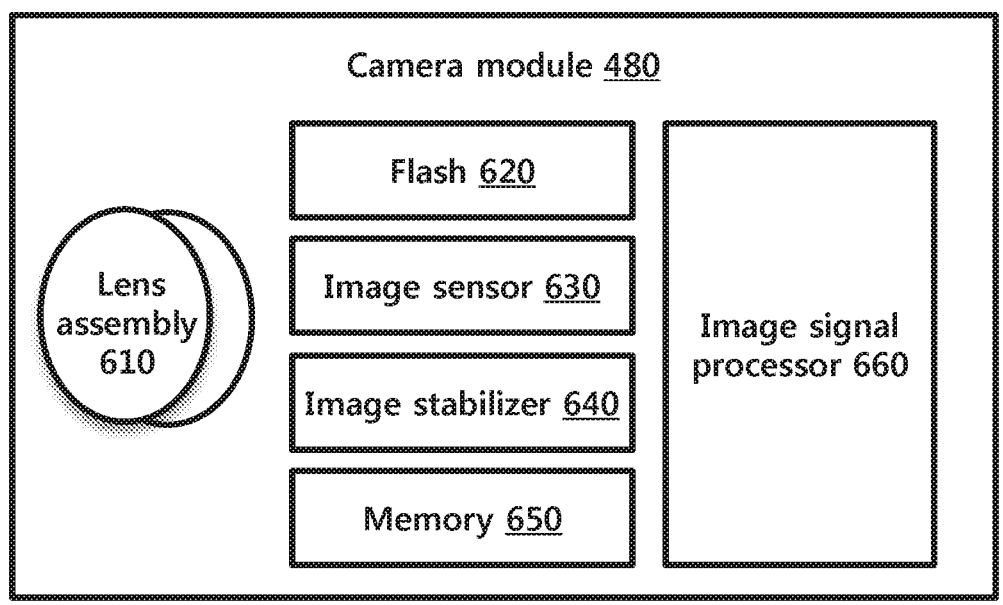
FIG. 5 is a block diagram of a camera module to which an apparatus and a method of the present disclosure is applied, according to one embodiment.

FIG. 5 is a block diagram of the camera module 480, according to one embodiment.

Referring to FIG. 5, the camera module 480 may include a lens assembly 610, a flash 620, an image sensor 630, an image stabilizer 640, a memory 650 (e.g., a buffer memory), or an image signal processor 660. The lens assembly 610 may collect light emitted or reflected from an object whose image is to be taken. The lens assembly 610 may include one or more lenses. According to one embodiment, the camera module 480 may include a plurality of lens assemblies 610. In this case, the camera module 480 may form, for example, a dual camera, a 360-degree camera, or a spherical camera. Some of the plurality of lens assemblies 610 may have the same lens attribute (e.g., view angle, focal length, auto-focusing, f number, or optical zoom), or at least one lens assembly may have one or more lens attributes that are different from those of another lens assembly. The lens assembly 610 may include, for example, a wide-angle lens or a telephoto lens.

The flash 620 may emit light that is used to reinforce light reflected from an object. According to one embodiment, the flash 620 may include one or more light emitting diodes (LEDs) (e.g., a red-green-blue (RGB) LED, a white LED, an infrared (IR) LED, or an ultraviolet (UV) LED) or a xenon lamp. The image sensor 630 may obtain an image corresponding to an object by converting light emitted or reflected from the object and transmitted via the lens assembly 610 into an electrical signal. The image sensor 630 may be selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 630 may be implemented using, for example, a charged coupled device (CCD) sensor or a complementary metal oxide semiconductor (CMOS) sensor.

The image stabilizer 640 may move the image sensor 630 or at least one lens included in the lens assembly 610 in a particular direction, or control an operational attribute (e.g., adjust the read-out timing) of the image sensor 630 in response to the movement of the camera module 480 or the electronic device 401 including the camera module 480. This allows compensating for at least part of a negative effect (e.g., image blurring) by the movement on an image being captured. The image stabilizer 640 may sense such a movement by the camera module 480 or the electronic device 401 using a gyro sensor or an acceleration sensor disposed inside or outside the camera module 480. The image stabilizer 640 may be implemented, for example, as an optical image stabilizer.

The memory 650 may store, at least temporarily, at least part of an image obtained via the image sensor 630 for a subsequent image processing task. For example, if image capturing is delayed due to shutter lag or multiple images are quickly captured, a raw image obtained (e.g., a Bayer-patterned image, a high-resolution image) may be stored in the memory 650, and its corresponding copy image (e.g., a low-resolution image) may be previewed via the display device 460. Thereafter, if a specified condition is met (e.g., by a user's input or system command), at least part of the raw image stored in the memory 650 may be obtained and processed, for example, by the image signal processor 660. The memory 650 may be configured as at least part of the memory 650 or as a separate memory that is operated independently from the memory 430.

The image signal processor 660 may perform one or more image processing with respect to an image obtained via the image sensor 630 or an image stored in the memory 650. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 660 may perform control (e.g., exposure time control or read-out timing control) with respect to at least one (e.g., the image sensor 630) of the components included in the camera module 480. An image processed by the image signal processor 660 may be stored in the memory 650 for further processing, or may be provided to an external component (e.g., the memory 430, the display device 460, the electronic device 402, the electronic device 404, or the server 408) outside the camera module 480. The image signal processor 660 may be configured as at least part of the processor 420, or as a separate processor that is operated independently from the processor 420. If the image signal processor 660 is configured as a separate processor from the processor 420, at least one image processed by the image signal processor 660 may be displayed, by the processor 420, via the display device 460 as it is or after being further processed.

The electronic device 401 may include a plurality of camera modules 480 having different attributes or functions. In this case, at least one of the plurality of camera modules 480 may form, for example, a wide-angle camera and at least another of the plurality of camera modules 480 may form a telephoto camera. Similarly, at least one of the plurality of camera modules 480 may form, for example, a front camera and at least another of the plurality of camera modules 480 may form a rear camera.

Figure 6:
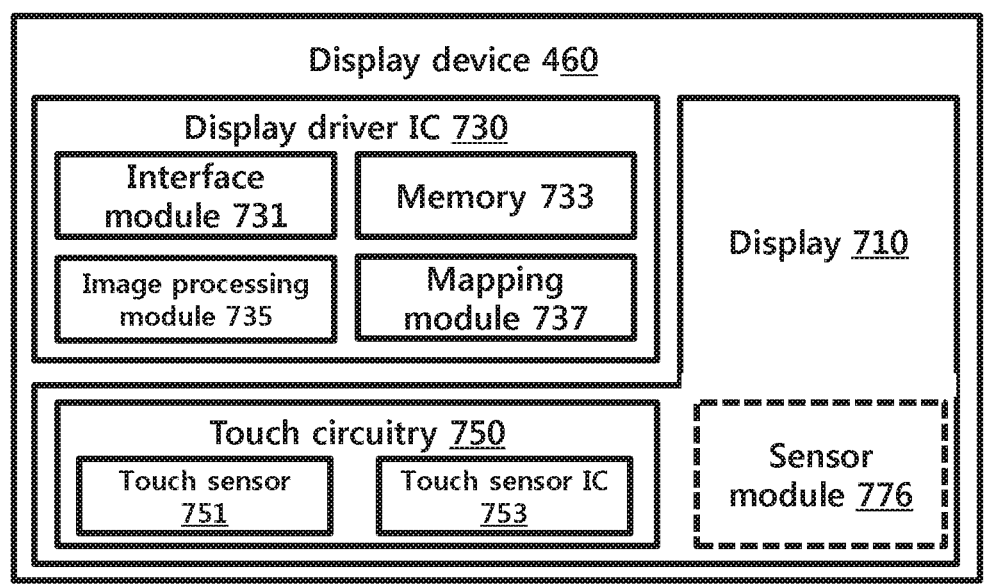
FIG. 6 is a block diagram of a display device to which an apparatus and a method of the present disclosure is applied, according to one embodiment.

FIG. 6 is a block diagram of the display device 460, according to one embodiment.

Referring to FIG. 6, the display device 460 may include a display 710 and a display driver integrated circuit (DDI) 730 to control the display 710. The DDI 730 may include an interface module 731, a memory 733 (e.g., a buffer memory), an image processing module 735, or a mapping module 737. The DDI 730 may receive image information that contains image data or an image control signal corresponding to a command to control the image data from another component of the electronic device 401 via the interface module 731. For example, according to one embodiment, the image information may be received from the processor 420 (e.g., the main processor 421 (e.g., an AP)) or the auxiliary processor 423 (e.g., a graphics processing unit) operated independently from the function of the main processor 421. The DDI 730 may communicate, for example, with touch circuitry 750 or the sensor module 776 via the interface module 731. The DDI 730 may also store at least part of the received image information in the memory 733, for example, on a frame by frame basis.

The image processing module 735 may perform pre-processing or post-processing (e.g., adjustment of resolution, brightness, or size) with respect to at least part of the image data. The pre-processing or post-processing may be performed, for example, based at least in part on one or more characteristics of the image data or one or more characteristics of the display 710.

The mapping module 737 may generate a voltage value or a current value corresponding to the image data pre-processed or post-processed by the image processing module 735. Generation of the voltage value or current value may be performed, for example, based at least in part on one or more attributes of the pixels (e.g., an array, such as an RGB stripe or a pentile structure, of the pixels, or the size of each subpixel). At least some pixels of the display 710 may be driven, for example, based at least in part on the voltage value or the current value such that visual information (e.g., a text, an image, or an icon) corresponding to the image data may be displayed via the display 710.

The display device 460 may further include the touch circuitry 750. The touch circuitry 750 may include a touch sensor 751 and a touch sensor IC 753 to control the touch sensor 751. The touch sensor IC 753 may control the touch sensor 751 to sense a touch input or a hovering input with respect to a certain position on the display 710. To achieve this, for example, the touch sensor 751 may detect (e.g., measure) a change in a signal (e.g., a voltage, a quantity of light, a resistance, or a quantity of one or more electrical charges) corresponding to the certain position on the display 710. The touch circuitry 750 may provide input information (e.g., a position, an area, a pressure, or a time) indicative of the touch input or the hovering input detected via the touch sensor 751 to the processor 420. At least part (e.g., the touch sensor IC 753) of the touch circuitry 750 may be formed as part of the display 710 or the DDI 730, or as part of another component (e.g., the auxiliary processor 423) disposed outside the display device 460.

The display device 460 may further include at least one sensor (e.g., a fingerprint sensor, an iris sensor, a pressure sensor, or an illuminance sensor) of the sensor module 476 or a control circuit for the at least one sensor. In this case, the at least one sensor or the control circuit for the at least one sensor may be embedded in one portion of a component (e.g., the display 710, the DDI 730, or the touch circuitry 750)) of the display device 460. For example, when the sensor module 476 embedded in the display device 460 includes a biometric sensor (e.g., a fingerprint sensor), the biometric sensor may obtain biometric information (e.g., a fingerprint image) corresponding to a touch input received via a portion of the display 710. For example, when the sensor module 776 embedded in the display device 460 includes a pressure sensor, the pressure sensor may obtain pressure information corresponding to a touch input received via a partial or whole area of the display 710. The touch sensor 751 or the sensor module 776 may be disposed between pixels in a pixel layer of the display 710, or over or under the pixel layer.

Figure 7:
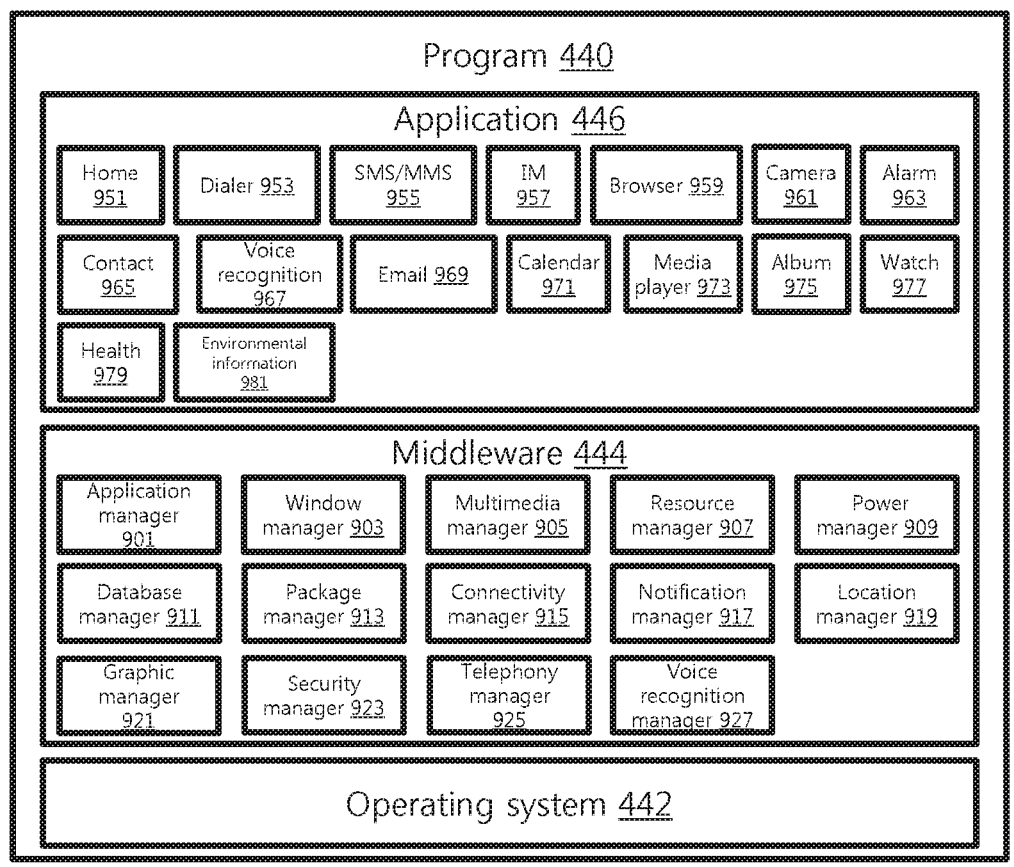
FIG. 7 is a block diagram of a program to which an apparatus and a method of the present disclosure is applied, according to one embodiment.

FIG. 7 is a block diagram of the program 440 according to one embodiment.

Referring to FIG. 7, the program 440 may include an OS 442 to control one or more resources of the electronic device 401, middleware 444, or an application 446 executable in the OS 442. The OS 442 may include, for example, Android®, iOS®, Windows®, Symbian®, Tizen®, or Bada™. At least part of the program 440, for example, may be pre-loaded on the electronic device 401 during manufacture, or may be downloaded from or updated by an external electronic device (e.g., the electronic device 402 or 404, or the server 408) during use by a user.

The OS 442 may control management (e.g., allocating or deallocation) of one or more system resources (e.g., process, memory, or power source) of the electronic device 401. The OS 442, additionally or alternatively, may include one or more driver programs to drive other hardware devices of the electronic device 401, for example, the input device 450, the sound output device 455, the display device 460, the audio module 470, the sensor module 476, the interface 477, the haptic module 479, the camera module 480, the power management module 488, the battery 489, the communication module 490, the subscriber identification module 496, or the antenna module 497.

The middleware 444 may provide various functions to the application 446 such that a function or information provided from one or more resources of the electronic device 401 may be used by the application 446. The middleware 444 may include, for example, an application manager 901, a window manager 903, a multimedia manager 905, a resource manager 907, a power manager 909, a database manager 911, a package manager 913, a connectivity manager 915, a notification manager 917, a location manager 919, a graphic manager 921, a security manager 923, a telephony manager 925, or a voice recognition manager 927.

The application manager 901, for example, may manage the life cycle of the application 446. The window manager 903, for example, may manage one or more graphical user interface (GUI) resources that are used on a screen. The multimedia manager 905, for example, may identify one or more formats to be used to play media files, and may encode or decode a corresponding one of the media files using a codec appropriate for a corresponding format selected from the one or more formats. The resource manager 907, for example, may manage the source code of the application 446 or a memory space of the memory 430. The power manager 909, for example, may manage the capacity, temperature, or power of the battery 489, and determine or provide related information to be used for the operation of the electronic device 401 based at least in part on corresponding information of the capacity, temperature, or power of the battery 489. The power manager 909 may interoperate with a basic input/output system (BIOS) of the electronic device 401.

The database manager 911, for example, may generate, search, or change a database to be used by the application 446. The package manager 913, for example, may manage installation or update of an application that is distributed in the form of a package file. The connectivity manager 915, for example, may manage a wireless connection or a direct connection between the electronic device 401 and the external electronic device. The notification manager 917, for example, may provide a function to notify a user of an occurrence of a specified event (e.g., an incoming call, message, or alert). The location manager 919, for example, may manage locational information on the electronic device 401. The graphic manager 921, for example, may manage one or more graphic effects to be offered to a user or a user interface related to the one or more graphic effects.

The security manager 923, for example, may provide system security or user authentication. The telephony manager 925, for example, may manage a voice call function or a video call function provided by the electronic device 401. The voice recognition manager 927, for example, may transmit a user's voice data to the server 408, and receive, from the server 408, a command corresponding to a function to be executed on the electronic device 401 based at least in part on the voice data, or text data converted based at least in part on the voice data. The middleware 444 may dynamically delete some existing components or add new components. According to one embodiment, at least part of the middleware 444 may be included as part of the OS 442 or may be implemented in other software separate from the OS 442.

The application 446 may include, for example, a home application 951, a dialer application 953, a short message service (SMS)/multimedia messaging service (MMS) application 955, an instant message (IM) application 957, a browser application 959, a camera application 961, an alarm application 963, a contact application 965, a voice recognition application 967, an email application 969, a calendar application 971, a media player application 973, an album application 975, a watch application 977, a health application 979 (e.g., for measuring the degree of workout or biometric information, such as blood sugar), or an environmental information application 981 (e.g., for measuring air pressure, humidity, or temperature information). The application 446 may further include an information exchanging application that is capable of supporting information exchange between the electronic device 401 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 869) of the electronic device 401 to the external electronic device. Additionally or alternatively, the notification relay application may receive notification information from the external electronic device and provide the notification information to a user of the electronic device 401.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus comprising a memory and a processor, wherein the memory is configured to store instructions that, when executed, cause the processor to:
    determine a weight map W(x, y) of a reference image $I_R$(x, y), where x is pixel of the reference image in a horizontal direction, and y is a pixel of the reference image in a vertical direction;
    sharpen the reference image using at least one sharpening method;
    determine an edge activity map Φ(x, y) for each sharpened image of the reference image by the at least one sharpening method;
    determine an edge activity map $Φ_R$(x, y) for the reference image;
    determine a probability density function (PDF) of the edge activity map $Φ_R$(x, y) of the reference image; and
    determine a cumulative density function (CDF) of the PDF,
    wherein a smooth area of the image is indicated by a CDF value of a processed pixel being less than a predetermined threshold.

2. The apparatus of claim 1, wherein determining the weight map W(x, y) of the reference image further comprises dividing each sharpened image into a smooth region and a detailed region.

3. The apparatus of claim 1, wherein the edge activity map Φ(x, y) for each sharpened image is determined based on a Sobel operator.

4. The apparatus of claim 2, wherein determining the weight map W(x, y) of the reference image further comprises:
    receiving a CDF, receiving a slope parameter α of a weight function, receiving a centering parameter β for dividing the reference image between smooth areas and detailed areas; and
    determining the weight map W(x, y) of the reference image, where α=10 and β=0.5.

5. The apparatus of claim 2, wherein the edge activity map Φ(x, y) for each sharpened image and the edge activity map $Φ_R$(x, y) for the reference image are each determined based on a Sobel operator.

6. The apparatus of claim 1, wherein the weight map W(x, y) has values between [−1 1], where a smooth region is indicated by a negative value, and a detailed region is indicated by a positive value.

7. The apparatus of claim 1, where the at least one sharpening method includes one from a combination including a Laplacian sharpening method and an edge preserving sharpening method.

8. The apparatus of claim 1, wherein the instructions, when executed, further cause the processor to:
    determine an edge sharpness metric (ESM) for each sharpened image based on the weight map W(x, y) and the edge activity map Φ(x, y) for each sharpened image. wherein the ESM is expressed as $$S = \frac{\sum_{y=0}^{M-1}\sum_{x=0}^{N-1} W(x, y)\Phi(x, y)}{MN},$$

where M is a width of the reference image, and N is a height of the reference image.

9. The apparatus of claim 1, wherein $$\Phi_R(x, y) = \sqrt{G_{vR}(x, y)^2 + G_{hR}(x, y)^2}, \text{ where}$$

$$G_{vR}(x, y) = \begin{bmatrix} 1 & 0 & -1 \\ 2 & 0 & -2 \\ 1 & 0 & -1 \end{bmatrix} * I_R(x, y), \text{ and}$$

$$G_{hR}(x, y) = \begin{bmatrix} 1 & 2 & 1 \\ 0 & 0 & 0 \\ -1 & -2 & -1 \end{bmatrix} * I_R(x, y).$$

10. A method, comprising:
    determining a weight map W (x, y) of a reference image $I_R$(x, y), where x is pixel of the reference image in a horizontal direction, and y is a pixel of the reference image in a vertical direction;

sharpening the reference image using at least one sharpening method;
determining an edge activity map Φ(x, y) for each sharpened image of the reference image by the at least one sharpening method;
determining an edge activity map $Φ_R$(x, y) for the reference image;
determining a probability density function (PDF) of the edge activity map $Φ_R$(x, y) of the reference image; and
determining a cumulative density function (CDF) of the PDF,
wherein a smooth area of the image is indicated by a CDF value of a processed pixel being less than a predetermined threshold.

11. The method of claim 10, wherein determining the weight map W(x, y) of the reference image further comprises:
receiving a CDF, receiving a slope parameter α of a weight function, and receiving a centering parameter β for dividing the reference image between smooth areas and detailed areas.

12. The method of claim 10, wherein the edge activity map Φ(x, y) for each sharpened image is determined based on a Sobel operator.

13. The method of claim 11, wherein α=10 and β=0.5.

14. The method of claim 11, wherein the edge activity map $Φ_R$(x, y) for the reference image is determined based on a Sobel operator.

15. The method of claim 10, wherein the weight map W(x, y) has values between [−1 1].

16. The method of claim 10, where the at least one sharpening method includes a Laplacian sharpening method and an edge preserving sharpening method.

17. The method of claim 10, further comprising:
determining an edge sharpness metric (ESM) for each sharpened image based on the weight map W(x, y) and the edge activity map Φ(x, y) for each sharpened image,
wherein the ESM is expressed as:

$$S = \frac{\sum_{y=0}^{M-1}\sum_{x=0}^{N-1} W(x, y)Φ(x, y)}{MN},$$

where M is a width of the reference image, and N is a height of the reference image.

18. The method of claim 10, wherein $Φ_R(x, y) = \sqrt{G_{vR}(x, y)^2 + G_{hR}(x, y)^2}$, where $G_{vR}(x, y) = \begin{bmatrix} 1 & 0 & -1 \\ 2 & 0 & -2 \\ 1 & 0 & -1 \end{bmatrix} * I_R(x, y)$, and $G_{hR}(x, y) = \begin{bmatrix} 1 & 2 & 1 \\ 0 & 0 & 0 \\ -1 & -2 & -1 \end{bmatrix} * I_R(x, y).$

* * * * *